United States Patent
Troxel et al.

(10) Patent No.: US 8,493,906 B1
(45) Date of Patent: Jul. 23, 2013

(54) WIRELESS AIRCRAFT GATEWAY WITH AUXILIARY BATTERY POWER

(75) Inventors: Robert V. Troxel, Brea, CA (US); Dale L. Nicponski, Norco, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 674 days.

(21) Appl. No.: 12/558,438

(22) Filed: Sep. 11, 2009

(51) Int. Cl.
*H04B 7/185* (2006.01)

(52) U.S. Cl.
USPC ......................................................... 370/316

(58) Field of Classification Search
USPC ......................................................... 370/316
See application file for complete search history.

(56) References Cited

U.S. PATENT DOCUMENTS

| | | | |
|---|---|---|---|
| 6,741,841 B1 | 5/2004 | Mitchell | |
| 6,810,527 B1 | 10/2004 | Conrad | |
| 6,965,816 B2 | 11/2005 | Walker | |
| 6,972,694 B2 | 12/2005 | Carroll | |
| 7,225,064 B2 | 5/2007 | Fudali | |
| 7,265,684 B2 * | 9/2007 | Stokes et al. | 340/945 |
| 7,546,123 B2 | 6/2009 | Wright | |
| 2003/0067542 A1 * | 4/2003 | Monroe | 348/148 |
| 2005/0062456 A1 * | 3/2005 | Stone et al. | 320/116 |
| 2005/0202785 A1 * | 9/2005 | Meyer | 455/66.1 |
| 2007/0072639 A1 * | 3/2007 | Frost et al. | 455/550.1 |
| 2007/0156313 A1 | 7/2007 | Fudali | |
| 2008/0033607 A1 * | 2/2008 | Zeliff et al. | 701/29 |
| 2010/0138879 A1 * | 6/2010 | Bird et al. | 725/76 |

* cited by examiner

*Primary Examiner* — Mark Rinehart
*Assistant Examiner* — Angel Brockman
(74) *Attorney, Agent, or Firm* — Donna P. Suchy; Daniel M. Barbieri

(57) ABSTRACT

An aircraft gateway processing system for wirelessly transferring data between an aircraft and a ground server. The aircraft gateway processing system includes an aircraft gateway processor unit that includes a protocol data processing unit; and, a store and forward unit operably connected to the protocol data processing unit. An auxiliary battery power unit is operably connected to the aircraft gateway processor unit and configured to provide self-powered operation of the aircraft gateway processing system in the event of a loss of aircraft power during communications or initiation of communication when aircraft power is not available. At least one wireless communication interface is operably connected to the aircraft gateway processor unit for connection to the internet and ultimately to a ground server connected to the internet. At least one network data interface is operably connected to the aircraft gateway processor unit and operably connectable to another aircraft unit.

17 Claims, 3 Drawing Sheets

WIRELESS AIRCRAFT GATEWAY WITH AUXILIARY BATTERY POWER

BACKGROUND OF THE INVENTION

1. Field of the Invention

The present invention relates generally to aircraft gateways, and more particularly to a wireless aircraft gateway with auxiliary battery power.

2. Description of the Related Art

Commercial aircraft which transport passengers will have aircraft cabin systems which are used to electronically automate various crew and passenger functions in the cabin. Examples of typical cabin system features include: passenger address announcement capability, cabin lighting control, individual passenger lighting control, shade control, climate control and monitoring, waste water control and monitoring. On a small aircraft, such as a business jet, the passenger entertainment functions such as entertainment audio and video are also controlled through the cabin system. To service the cabin system electronics, it is important for maintenance personnel to have maintenance (diagnostic) data to verify the system is operating properly. If this maintenance data can be offloaded to the ground, the maintenance process can be improved through the use of additional analysis tools and technical experts that yield reduced failure diagnosis times and more accurate diagnosis of failures. Unfortunately cabin system maintenance data is not being off-loaded on a consistent basis to enable rapid response for resolving aircraft cabin system maintenance issues. Cabin system maintenance data includes BIT/BITE data, software event log data, and aircraft configuration data. Having such data on the ground enables maintenance personnel to more rapidly troubleshoot and identify aircraft cabin system problems remotely from the aircraft. (Built in Test (BIT) or Built in Test Equipment (BITE) refer to hardware electronics and software that is used to automatically diagnose electronic failures). Impediments to offloading a complete set of maintenance data include requiring human action to perform the data offloads. This may result in inconsistent data gathering and increased costs. Also, aircraft electronics may be powered down shortly after the aircraft arrives at the gate. This is especially true for business jets. Existing aircraft data offload methods are inconsistently gathered, expensive to acquire, and only operate while the aircraft is powered with limited time for data transfers or access. Data offloads are neither automated nor performed consistently. Additionally cabin system data, such as software, databases, and content, needs to be periodically loaded on the ground. Manual electronic media data loading methods typically utilize maintenance personnel servicing the aircraft that must hand carrying the electronic data file on an electronic media to the aircraft and then load it on aircraft while the aircraft has power applied. This data load task must be completed in a limited time window before takeoff while power is available. Impediments to loading data to aircraft include having maintenance personnel available for the task. Aircraft cabin system electronics may not have power available for a significant amount of time prior to flight. This is especially true for business jets. The limited time power is available prior to the scheduled aircraft flight makes it difficult to load large data files to aircraft using a gateway. Existing aircraft gateway devices typically only service avionics or inflight entertainment electronics and do not service the cabin system electronics. Furthermore, they do not have auxiliary battery power to provide power for off aircraft wireless communications when aircraft power is unavailable, thus complicating the logistics of automating data transfers.

There are numerous patents that have issued that have involved wireless methods for delivery of data to an aircraft. These include:

U.S. Pat. No. 6,741,841, entitled "Dual Receiver for an On-Board Entertainment System" discloses a communication system for use with a mobile platform. The communication system can be configured to store video data on-board to allow pseudo-live or live broadcasts to be played as the mobile platform traverses a number of broadcasts regions. The mobile platforms can be automobiles, aircraft, boats, ships, trains, or other vehicles. The communication system allows Internet access, movies, and other entertainment and business functions to be performed.

U.S. Pat. No. 7,546,123, entitled "Wireless Ground Link-Based Aircraft Data Communication System with Roaming Feature" discloses a data communication system for use between an aircraft and a ground station.

U.S. Pat. No. 6,810,527, entitled "System and Method for Distribution of Media Context and Other Data to Aircraft Passengers," discloses a data communication system for sending content data to the aircraft wirelessly from a ground station.

U.S. Pat. Nos. 6,741,841, 7,546,123 and 6,810,527 each disclose use of an aircraft communication platform for loading and offloading aircraft data; but, do not address the need to provide operation after aircraft power is turned off. Such systems would not be advantageous in a business jet environment where aircraft power is typically turned off immediately upon arrival and remains unpowered until the next flight. Requiring power to aircraft for gateway data transfers creates a logistical problem in using the gateway in a business jet. These solutions are more suited for an air transport jet type of application where power can be continuously available to the aircraft in the air or on the ground.

There is a need for an onboard gateway to operate on the ground when aircraft power is turned off, particularly in a business aircraft environment where power is removed shortly after landing and is restored only shortly prior to the next flight. Furthermore, the onboard gateway electronics also needs the ability to continue offloading data to the ground server when aircraft power is turned off or interrupted during the data exchange. As part of the data exchange process, there is a need to resume data transmission or reception with the ground server such that an interrupted data transmission can be resumed from where it was previously interrupted. There is a need to operate in an environment where these interruptions could be from a few seconds to hours in length. This would result in saving valuable time and transmission costs associated with restarting the data transmission from the beginning, especially for the exchange of large files. Such a situation can arise when the data link connection is interrupted and then resumed.

There is an additional need to exchange data between the ground server and the aircraft without human involvement. This allows critical data to be available on the aircraft when personnel power up the aircraft. As a result, there is a need for the onboard gateway electronics to periodically wake up and check for new data to be loaded to the aircraft when aircraft power is not available.

To support un-manned data exchanges, there is a need for the gateway electronics to receive and store data until the data can be forwarded to the intended onboard aircraft system once power to aircraft is restored. There is an additional need for a gateway to accept data from an aircraft system and store it until a communication channel to the ground server is available or allowed at which time the gateway would forward the stored data to the ground server.

SUMMARY OF THE INVENTION

In a broad aspect, the present invention is an aircraft gateway processing system for wirelessly transferring data between an aircraft and a ground server. The aircraft gateway processing system includes an aircraft gateway processor unit that includes a protocol data processing unit; and, a store and forward unit operably connected to the protocol data processing unit. An auxiliary battery power unit is operably connected to the aircraft gateway processor unit and configured to provide self-powered operation of the aircraft gateway processing system in the event of a loss of aircraft power during communications or initiation of communication when aircraft power is not available. At least one wireless communication interface is operably connected to the aircraft gateway processor unit for connection to the internet and ultimately to a ground server connected to the internet. At least one network data interface is operably connected to the aircraft gateway processor unit and operably connectable to another aircraft unit.

Maintenance data can be offloaded; or, software, databases, or, entertainment content can be loaded through the wireless data connection between the aircraft gateway processing system and the ground based IP network. Communication reliability is enhanced by the auxiliary battery power unit (i.e. backup battery) to provide power to the aircraft gateway processing system electronics even when aircraft power is removed. When on battery power, data can be transferred between the gateway processing system storage memory and the ground server or from the ground server to the gateway processing system storage memory. When aircraft power returns, data can be transferred between the aircraft gateway processing system and the aircraft unit(s). This method decouples the transfer of data from the time period the aircraft has power applied, which typically is a limited timeframe on the ground. Communications reliability is also improved by adding multiple wireless device interface options which allows the aircraft gateway processing system to communicate through different wireless interface technologies (e.g. 802.11B vs. 802.11A vs. Cellular). The gateway processing system can select the interface that provides the best link data throughput at the least cost.

The present invention facilitates offloading and loading of cabin system maintenance data in a reliable, low cost manner. Using the wireless gateway to perform offloading and loading of data eliminates a time consuming maintenance task on the aircraft. The present invention is particularly advantageous for implementation with business jets, saving fuel and minimizing energy use. It allows data transfers to continue in the event of an on ground power interruption. The auxiliary power source will continue providing power to the gateway electronics during the power interruption. The store and forward nature of the invention decouples the two parts of each transfer. The transfer of data between aircraft and gateway is typically much faster and more reliable as connections are hardwired. The transfer of data between gateway electronics and the ground infrastructure is typically much slower and less reliable as it is subjected to more interruptions from loss of wireless link or loss of power. As data is locally stored in the gateway, recovery from loss of data link can be more rapidly achieved when a reliable file transfer protocol is used that supports data block recovery. The invention protects against the likely failure scenarios during aircraft to ground part of the gateway data transfer and hence makes the overall data transfer process more reliable. The gateway processing system also allows the gateway to periodically wake-up and communicate with the ground server to complete data transfers or to initiate data transfers from the ground server that are intended for the aircraft once aircraft power is restored. This invention allows maps, charts and flight plans to be loaded to an aircraft prior to personnel arriving at the aircraft and turning on power. Once power is restored to the aircraft, the gateway can forward this data to the appropriate aircraft system/unit.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
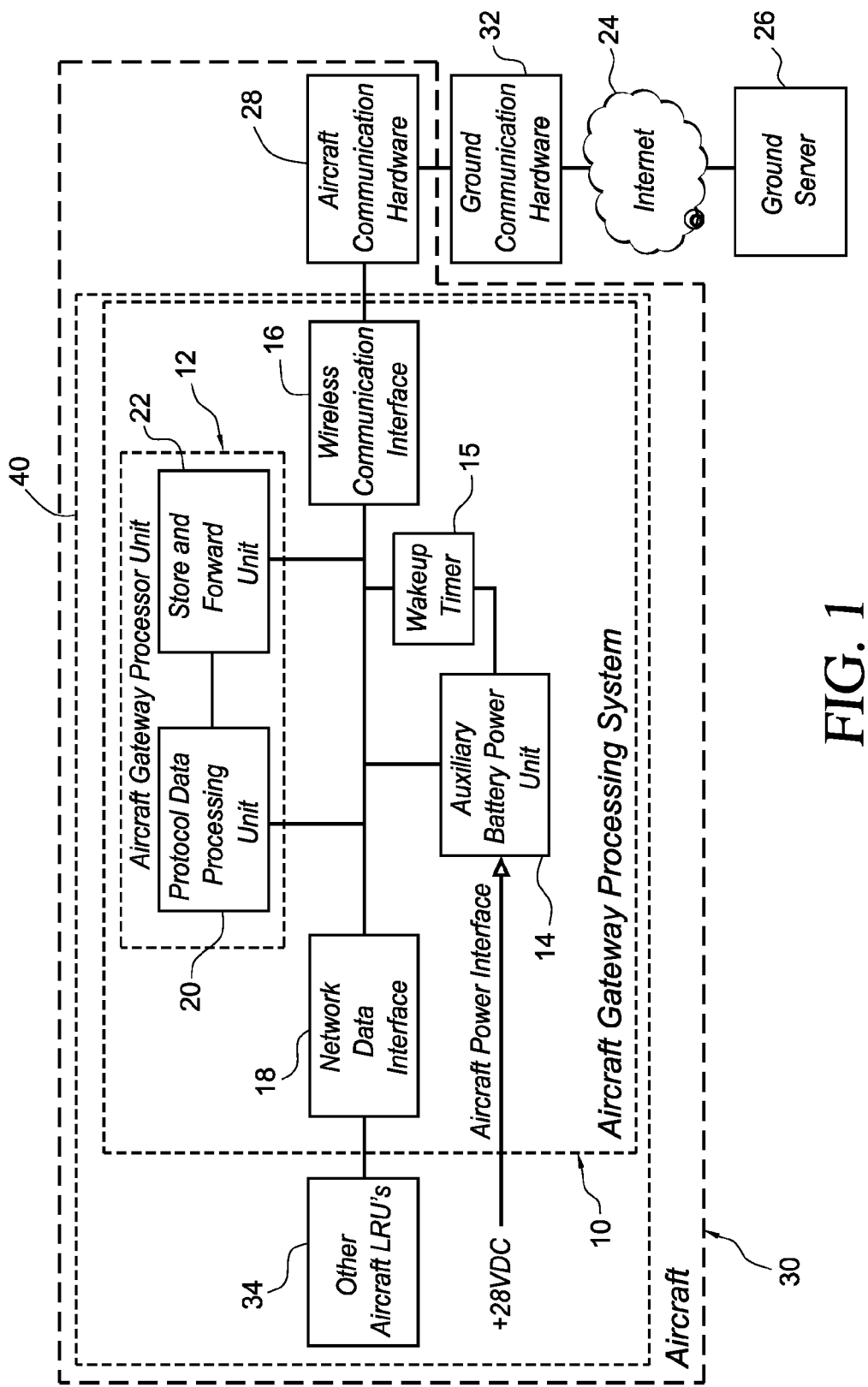
FIG. 1 is a schematic diagram of the aircraft gateway processing system of the present invention, shown within an aircraft environment.

Referring now to the drawings and the characters of reference marked thereon, FIG. 1 illustrates the aircraft gateway processing system, designated generally as 10. The aircraft gateway processing system 10 includes an aircraft gateway processor unit, designated generally as 12; an auxiliary battery power unit 14; at least one wireless communication interface 16; and, at least one network data interface 18.

The aircraft gateway processor unit 12 includes a protocol data processing unit 20; and, a store and forward unit 22 operably connected to the protocol data processing unit 20. The protocol data processing unit 20 may be, for example, a microprocessor with DRAM for temporary data storage and flash for code storage, such as a Pentium processor, or Power PC processor, or Arm processor with sufficient performance to rapidly process communications data packets. The store and forward unit 22 may be, for example, bulk storage memory such as Flash Integrated Circuits or a Solid State Flash Drive or a Flash Memory Card. For example, in transferring data from the aircraft to the ground server, while the aircraft still has power, the store and forward feature allows the transfer of data as quickly as possible from the aircraft system/unit, to a storage space inside the gateway. If the power then goes off, the file being transferred to the ground server is in the gateway. The store and forward unit has sufficient storage memory to provide this feature. For example, it may have 16 GB or more of flash, enough to store large aircraft databases. The store and forward function may be bi-directional or unidirectional.

The auxiliary battery power unit 14 is operably connected to the aircraft gateway processor unit 12 and configured to provide self-powered operation of the aircraft gateway processing system 10 in the event of a loss of aircraft power during communications. The auxiliary battery power unit 14 may be, for example, a system that includes: a battery or other energy storage device, a charging circuit to recharge the battery or energy storage device, and a power switch to switch between battery power and the external power input. The gateway processing system 10 may be powered by the aircraft power system when aircraft power is turned on; otherwise, the gateway processing system 10 is powered from the auxiliary battery storage unit 14.

The aircraft gateway processing system 10 preferably includes a wakeup timer 15 operably connected to the auxiliary battery power unit 14 and to the aircraft gateway processor unit 20 for triggering the restoration of battery power to the aircraft gateway processing system 10. The wakeup timer 15 should allow the protocol data processing unit 20 to program the wakeup time interval.

The wireless communication interface 16 is operably connected to the aircraft gateway processor unit 12 for connection to the internet 24 and ultimately to a ground server 26 connected to the internet 24. The wireless communication interface 16 may be, for example, a cellular data modem or an 802.11(a/b/g/N) adapter data transferring device. The cellular data modem wireless communication device may be GSM or EVDO or any other such 3G or 4G compatible cellular protocol that support high speed data transfers. The 802.11 wireless adapter may support one or more 802.11 protocols such as 802.11a, 802.11b, 802.11g, and 802.11n. This connection may be via aircraft communication hardware 28 on the aircraft 30; and, ground communication hardware 32. For example, the aircraft communication hardware could be a satellite communication component that communicates to the ground communication hardware via a satellite link and ultimately the internet 24. The aircraft communication hardware could also be an on aircraft wireless 802.11 component that has a connection to the ground via a radio link. The communications interfaces may provide secure or unsecure communications.

The network data interface 18 is operably connected to the aircraft gateway processor unit 12 and operably connectable to other aircraft units 34, typically Line Replaceable Units (LRUs). (The term "LRU" refers to the various electronics units onboard the aircraft that must be maintained by the aircraft maintenance persons). The network data interface 18 may be implemented, for example, by a USB or Ethernet interface. Furthermore, it may be a wireless or wired interface. This network data interface 18 allows aircraft LRU's 34 to exchange data with the aircraft gateway processing system 10. The exchange of data may be via standard TCP/IP protocols or via custom protocols that allow exchange of data. The data exchanges may be via secure or unsecure communications. (As used herein, the terms aircraft units or LRUs, are construed broadly to include instances where these units extend outside the cabin system 40 to, for example, the avionic system, communication system; or, inflight entertainment system via an extended data network).

Figure 2:
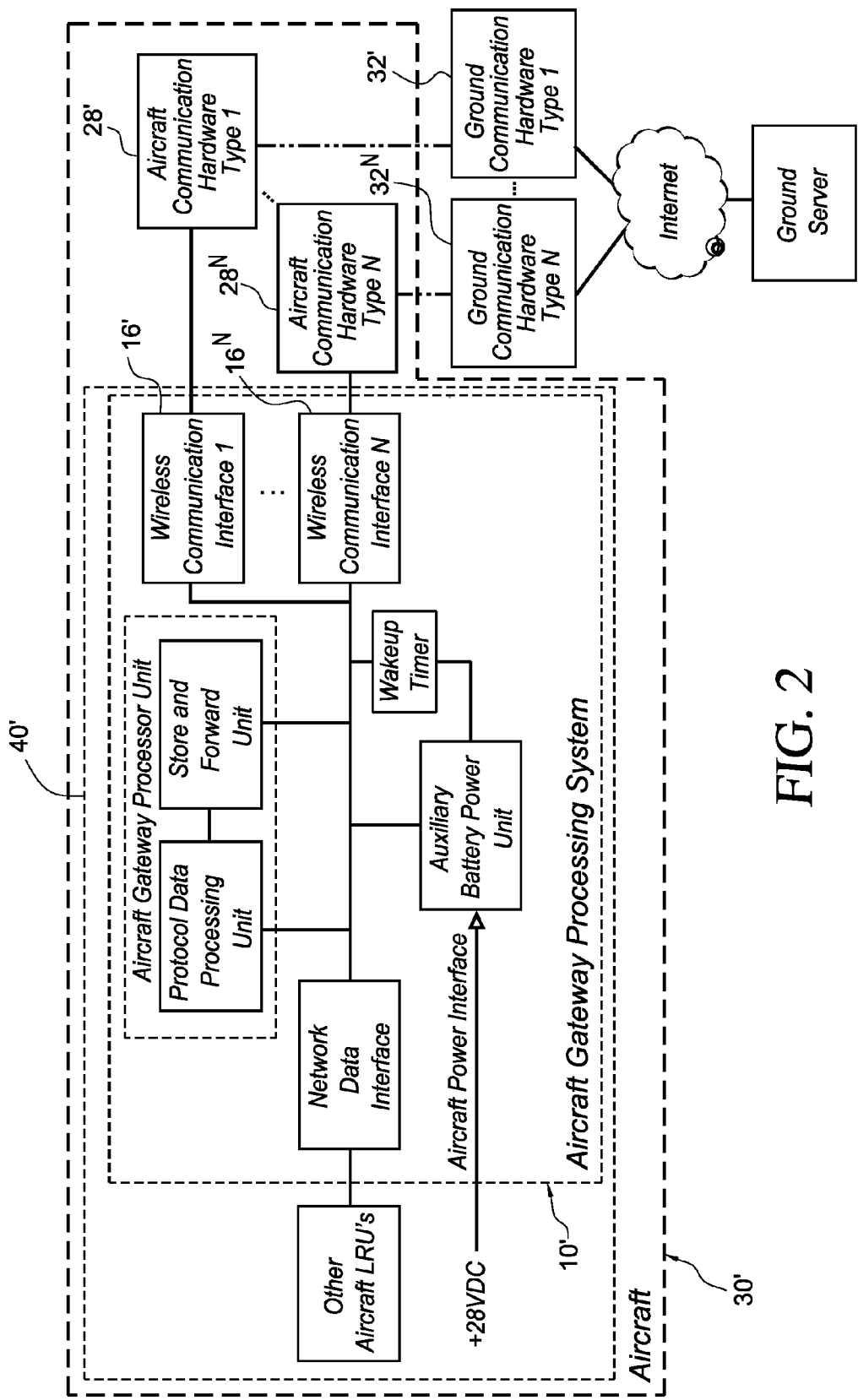
FIG. 2 shows an embodiment of the aircraft gateway processing system, with multiple wireless communication interfaces.

Referring now to FIG. 2, another embodiment of the aircraft gateway processing system is illustrated, designated generally as 10', which utilizes a plurality of wireless communication interfaces 16', 16", ... 16$^N$. Wireless communication interfaces 16', 16", ... 16$^N$ communicate with associated aircraft communication hardware 28', 28", ... 28$^N$ on the aircraft 30'. Connection to the internet is provided by ground communication hardware 32', 32", ... 32$^N$. This plurality of communication interfaces enables the system to operate at more locations since some communication links will not be available at every location. For example, a 802.11 wireless interface may not be functional where the aircraft is parked but a cellular modem interface would be operable. The plurality of interfaces also allows the system to choose which interface to use based on the cost of exchanging data and/or the speed of the data exchange. For example, a 802.11 interface may be available as free whereas a satellite link would charge based on the quantity of data being sent. The aircraft gateway processing system 10 may be configured to choose the best wireless communication interface 16$^N$ based on cost, priority of data, and urgency of the data to be transferred.

Figure 3:
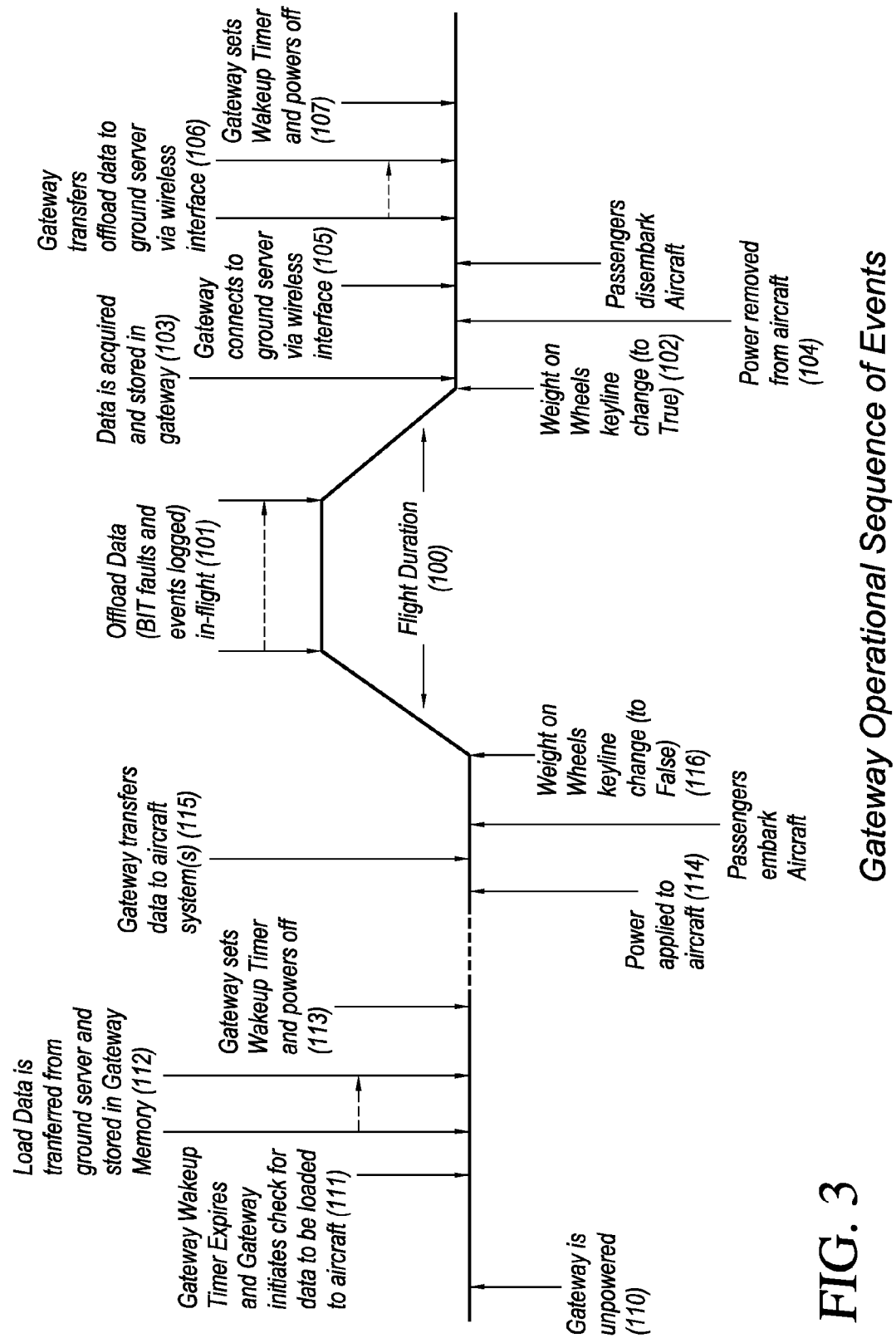
FIG. 3 illustrates the Gateway Operational Sequence of Events, in accordance with the principles of the present invention.

Referring now to FIG. 3, a chart illustrating the Gateway Operational Sequence of Events is illustrated. When the aircraft is in the air during flight (100), the cabin system (40) gathers maintenance data from the other aircraft LRU's (34). The maintenance data will include such things as diagnostic faults and software events that are logged (101). The aircraft landing (102) is electronically sensed through a variety of means such as the Weight-On-Wheels keyline (102), or other aircraft computer data via the other Aircraft LRU's (34). Upon aircraft landing (102) being detected either the Gateway (10) or the cabin system (40), will prepare the maintenance data for offload to the ground server (26). The gateway (10) will communicate with the cabin system (40) to gather the data to be offloaded via the network data interface (18) and will store the data in Gateway store and forward unit (22) flash memory as part of the Gateway store and forward operation. At this point the maintenance data is securely stored in the gateway non-volatile store and forward memory (103). If aircraft power is removed (104) from cabin system (40), the offload can still continue under battery power from the auxiliary battery power unit (14) without interruption from the power removal (104). The gateway (10) will then determine the least cost wireless route (16, 28, 32, 24) for the data connection to the ground server (26) and make a data connection (105). The gateway (10) will then forward the maintenance data to the ground server (26) by reading the data from gateway store and forward memory (22) and forwarding it to the ground using the data connection already established (106). When the current data transfer to the ground is complete (106), the gateway checks if there are additional maintenance tasks to be performed. If yes, these additional tasks are performed. If no, the gateway sets a wakeup timer (15) and powers itself off by disconnecting itself from auxiliary battery power (107). The wakeup timer (15) will determine when the gateway (10) should be powered on again to check for new maintenance tasks such as loading data to the aircraft (30). Once the maintenance data is received at the ground server (26), maintenance experts and technicians can review the data and determine what action, if any, is needed on the cabin system (40) electronics.

Still referring to FIG. 3, prior to the next flight, it may be separately determined that a particular set of data files needs to be delivered to the aircraft (30) such that they are loaded on the cabin system (40) for the next flight. With the aircraft (30) on the ground and the aircraft electronics unpowered (110), should the Gateway wakeup timer (15) expire, the gateway (10) will be switched on running off of battery power from the auxiliary battery power unit (14). The gateway processor (20) will initiate connection with the ground server (26) and check if there are maintenance tasks to be performed (111) such as loading data to the aircraft (30). If there is data to be sent to the aircraft (30), the gateway (10) will initiate the transfer of data from the server (26) to the gateway (10). The gateway (10) will store the data being loaded in the store and forward unit (22) nonvolatile flash memory (112). Once the file is transferred to the gateway (10), the gateway (10) can disconnect from the ground server (26), if there are no additional gateway (10) maintenance tasks to be performed (112). If the gateway (10) is still using battery power from the auxiliary battery power unit (14), the gateway processor (20) will set the wake up timer (15) and disable the auxiliary battery power unit (14) and power down (113). Once power is restored to the aircraft cabin electronics (114), the gateway (10) will power on and recognize there is data in store and forward memory unit (22) that needs to be loaded to cabin system (40). The gateway (10) will initiate the transfer of the data load, whereby, the data is read from store and forward memory unit (22) and transferred (115) via the network interface to the appropriate Other Aircraft LRU's (34). The gateway (10) detects that the aircraft is in flight by monitoring the Weight on Wheels keyline (116) or the aircraft computer data via the other aircraft LRU's (34). The advantage of this method of preloading the gateway with data to be transferred to the aircraft is that there will be minimal time from the aircraft receiving power until the time at which the aircraft will fly away. The time consuming part of the transfer is typically the wireless transfer to the aircraft while the transfer time from gateway to aircraft unit via the network interface can be fast. The present method minimizes the data transfer time to the unit after power is restored to the aircraft such that the aircraft is ready to operate with the new load data in a minimal amount of time. The proposed method also is advantageous in that it delivers the aircraft data to be loaded to the aircraft prior to the start of the next flight without requiring manual transport and installation at the aircraft by a maintenance person. A maintenance person can set up a file load to an aircraft electronically at the ground server. The next time the gateway communicates to the ground server the file will be loaded to the aircraft cabin electronics units.

Other embodiments and configurations may be devised without departing from the spirit of the invention and the scope of the appended claims.

The invention claimed is:

1. An aircraft gateway processing system for wirelessly transferring data between an aircraft and a ground server, comprising:
   a) an aircraft gateway processor unit positioned on an aircraft, comprising:
      i) protocol data processing unit; and,
      ii) a store and forward unit operably connected to said protocol data processing unit configured to transfer data from an aircraft to a ground server wherein aircraft weight on wheel keyline data is utilized to initiate the gather, store, and forward of maintenance data for a ground server offload;
   b) an auxiliary battery power unit positioned on the aircraft, operably connected to said aircraft gateway processor unit and configured to provide self-powered operation of said aircraft gateway processing system in the event of a loss of aircraft power during communications or initiation of communication when aircraft power is not available;
   c) at least one wireless communication interface positioned on the aircraft, operably connected to said aircraft gateway processor unit for connection to the internet and ultimately to a ground server connected to the internet;
   d) at least one network data interface positioned on the aircraft, operably connected to said aircraft gateway processor unit and operably connectable to another aircraft unit; and,
   e) a wakeup timer positioned on the aircraft, operably connected to said auxiliary battery power unit and to said aircraft gateway processor unit for triggering the restoration of battery power to said aircraft gateway processing system.

2. The system of claim 1, further including said ground server operably connected to said wireless communication interface via the internet.

3. The system of claim 1, wherein communications between said aircraft gateway processor unit and the ground server are secure communications.

4. The system of claim 1, wherein communications between said aircraft gateway processor unit and another aircraft unit are secure communications.

5. The system of claim 1, wherein said at least one wireless communication interface comprises a plurality of wireless communication interfaces, said aircraft gateway processor unit directing communication over the least cost, available of said wireless communication interfaces.

6. The system of claim 1, wherein said network data interface is a wireless or wired interface.

7. The system of claim 1, wherein store and forward unit comprises at least 16 GB of memory.

8. The system of claim 1, wherein the aircraft gateway processor unit becomes periodically operational using the auxiliary battery power unit to communicate with the ground server to determine if data needs to be loaded to the aircraft.

9. The system of claim 1, wherein the aircraft gateway processor unit can remain operational when offloading aircraft data to the ground server by using the auxiliary battery power unit, when aircraft power is not available, to enable the data offload operation to proceed.

10. The system of claim 1, wherein the aircraft gateway processor unit can remain operational when loading aircraft data from the ground server by using the auxiliary battery power unit, when aircraft power is not available, to enable the data loading operation to proceed.

11. The system of claim 1, wherein the aircraft gateway processor unit becomes periodically operational using the auxiliary battery power unit to communicate with the ground server to determine if data needs to be loaded to the aircraft; and, wherein the aircraft gateway processor unit can remain operational when offloading aircraft data to the ground server by using the auxiliary battery power unit, when aircraft power is not available, to enable the data offload operation to proceed.

12. A system for wirelessly transferring data between an aircraft and a ground server, comprising:
   a) an aircraft gateway processing system positioned on an aircraft, comprising:
      i) an aircraft gateway processor unit comprising:
         1. protocol data processing unit; and,
         2. a store and forward unit operably connected to said protocol data processing unit configured to transfer data from an aircraft to a ground server wherein aircraft weight on wheel keyline data is utilized to initiate the gather, store, and forward of maintenance data for a ground server offload;
      ii) an auxiliary battery power unit operably connected to said aircraft gateway processor unit and configured to provide self-powered operation of said aircraft gateway processing system in the event of a loss of aircraft power during communications or initiation of communication when aircraft power is not available;
      iii) at least one wireless communication interface operably connected to said aircraft gateway processor unit for connection to the internet and ultimately to a ground server connected to the internet;
      iv) at least one network data interface operably connected to said aircraft gateway processor unit and operably connectable to another aircraft unit; and,
      v) a wakeup timer positioned on the aircraft, operably connected to said auxiliary battery power unit and to said aircraft gateway processor unit for triggering the restoration of battery power to said aircraft gateway processing system; and,
   b) aircraft communication hardware positioned on the aircraft, operatively connected to said aircraft gateway processing system, said aircraft communication hardware being operatively connectable to ground communication hardware that is operatively connected to a ground server.

13. The system of claim 12, further including said ground server operably connected to said wireless communication interface via the internet.

14. The system of claim 12, wherein communications between said aircraft gateway processor unit and the ground server are secure communications.

15. The system of claim 12, wherein communications between said aircraft gateway processor unit and another aircraft unit are secure communications.

16. The system of claim 12, wherein said at least one wireless communication interface comprises a plurality of wireless communication interfaces, said aircraft gateway processor unit directing communication over the least cost, available of said wireless communication interfaces.

17. The system of claim 12, wherein the aircraft gateway processor unit becomes periodically operational using the auxiliary battery power unit to communicate with the ground server to determine if data needs to be loaded to the aircraft; and, wherein
  the aircraft gateway processor unit can remain operational when offloading aircraft data to the ground server by using the auxiliary battery power unit, when aircraft power is not available, to enable the data offload operation to proceed.

* * * * *